(12) United States Patent
Busse

(10) Patent No.: US 6,205,710 B1
(45) Date of Patent: Mar. 27, 2001

(54) AUTOMATIC DOOR OPENING ARRANGEMENT

(75) Inventor: Gerald Busse, Hildesheim (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 09/442,824

(22) Filed: Nov. 18, 1999

(30) Foreign Application Priority Data

Nov. 19, 1998 (DE) .............................................. 198 53 344

(51) Int. Cl.$^7$ .................................................... E05F 15/02
(52) U.S. Cl. ..................................................... 49/27; 49/26
(58) Field of Search ............................. 296/146.4; 49/26, 49/27, 28, 25

(56) References Cited

U.S. PATENT DOCUMENTS

| | | | |
|---|---|---|---|
| 4,458,446 | 7/1984 | Mochida et al. ........................ 49/28 |
| 4,577,437 | * 3/1986 | Gionet et al. ......................... 49/26 X |
| 4,914,859 | * 4/1990 | Gionet et al. ......................... 49/26 X |
| 5,581,944 | * 12/1996 | Kornbrekke et al. .................... 49/28 |
| 5,886,307 | * 3/1999 | Full et al. ............................ 49/26 X |

FOREIGN PATENT DOCUMENTS 19533804    3/1996 (DE) .
19537619    4/1997 (DE) .

* cited by examiner

Primary Examiner—Jerry Redman
(74) Attorney, Agent, or Firm—Baker Botts L.L.P.

(57) ABSTRACT

An automatic door opening arrangement for motor vehicles includes a sensor system for detection of objects in a predetermined region adjacent to a vehicle and a computing unit for at least one door which indicates entry of an object into the predetermined region. The automatic door opening arrangement prevents, as reliably as possible, injury of persons and/or damage to obstacles or to the door itself upon opening of the door, since the sensor system determines the height of an object located in the predetermined region relative to a given reference coordinate system.

10 Claims, 2 Drawing Sheets

AUTOMATIC DOOR OPENING ARRANGEMENT

BACKGROUND OF THE INVENTION

This invention relates to automatic door opening arrangements for motor vehicles having sensors for detection of objects in the vicinity of a vehicle door.

Automatic door opening arrangements of this type permit a vehicle door to be opened upon demand only as far as permitted by any obstacles detected in the door opening region by the sensors on a motor vehicle, for example, which is equipped with the door opening arrangement. Such arrangements allow objects constituting stationary obstacles to opening of the door to be detected before or upon opening of the door so that damage to the door or to the obstacle located in the vicinity of the door can be avoided. In addition, accidents involving obstacles or persons moving into the region of swinging motion of the door can be avoided.

A conventional automatic door opening arrangement is disclosed, for example, in German Offenlegungsschrift No. 195 33 804 which provides an auxiliary holding device for limiting the angle of the opening of the door, utilizing a sensor which detects objects without contact and which is mounted on the outer edge of the door opposite from the pivot axis edge of the door. When the sensor reaches a specified distance from an object near the vehicle during opening of the door, the sensor triggers the auxiliary holding device almost instantaneously, causing it to lock. Although the distance from a neighboring vehicle can be determined by the sensor mounted on the rear edge of the door, this does not permit reliable detection of the adjacent region covered by the opening of the door or of the traffic activity approaching the door.

German Offenlegungsschrift No. 195 37 619 discloses an arrangement for monitoring the traffic spacing of a motor vehicle which has at least one traffic spacing sensor for detecting an object approaching the vehicle and an associated signaling system responsive to the approach of an object which prevents, impedes or blocks the opening of at least one door of the vehicle, and/or indicates the approach by a signaling system. In that arrangement, the traffic spacing sensor is designed and mounted to monitor essentially the traffic situation behind the vehicle. Reliable monitoring of traffic activity that is encountered by an opening door opening cannot always be assured with that arrangement.

In the arrangement disclosed in that reference, the device that indicates entry of an object into the protected region may constitute a warning device or a device to prevent, impede or block opening of the door.

SUMMARY OF THE INVENTION

Accordingly, it is an object of the present invention to provide an automatic door opening arrangement which overcomes disadvantages of the prior art.

Another object of the invention is to provide an automatic door opening arrangement that avoids, with a high degree of reliability, danger to persons and/or damage to obstacles or to the door itself upon opening of a door.

These and other objects of the invention are attained by providing an automatic door opening arrangement with a sensor system which allows the position of an object in a specified region to be reliably detected. The specified region preferably corresponds to the immediate region encompassed by the swing motion of the door, optionally with the addition of a safety zone. The monitored region advantageously extends over a greater region, which may extend along the length of the vehicle or even beyond it and which has a width of several meters, for example of about two meters, from the side of the vehicle having the sensor system associated with the door.

According to a first embodiment of the door opening arrangement of the invention, the door operator, for example the driver of a motor vehicle, can monitor potentially interfering activity adjacent to the door, for example traffic activity, independently. Upon demand, the door can be opened as wide as any obstacles in the door opening region of the vehicle permit. The door opening arrangement according to the invention, which may be capable of detecting multiple targets, can recognize obstacles, in particular stationary obstacles, in a specified volumetric region outside the door and locate their positions. This applies both when the door is closed as well as when the door is partially or fully open. The door can be blocked from opening or be opened only by a predetermined amount determined by an associated holding device. In addition, the force required to open the door or the door opening speed can be set, optionally as a function of distance of the door from the detected object. The sensor system is preferably designed so that the absolute height of any object located in the entire door opening region is determinable with respect to a reference coordinate system. The detection of object height may be limited to a specified maximum height, which may correspond to the height of the bottom of the open door, desirably with the addition of a predetermined safety zone. The door height is the level of the bottom of the door when opened. Object height, i.e., the height of the object, can also advantageously be determined by the sensor system.

Alternatively, the detection of object height may be related to specified regions of height in the reference coordinate system, for example, to a region of 0.5 m to 1 m, where only the part of an object which extends above the minimum door height region is indicated.

In this arrangement, the reference coordinate system is defined in its spatial relationship to the sensor system provided in the door.

The location of a detected object can be determined not only with respect to its position in a plane, but also in its spatial three-dimensional relationship to the sensor device, as well as alternatively with reference to a change in direction and/or speed in these dimensions.

Advantageously, the sensor system includes an ACC system (adaptive or automatic cruise control providing an automatic speed governor), by which an azimuthal triangulation of objects in a plane of constant height is effected in order to detect objects. Thus, the space lying outside or behind the door in the direction of motion of the sensor device can be reliably covered. The adjacent traffic activity thus can be automatically monitored, and the door can only be opened upon demand when the traffic situation so allows. In addition, the door is automatically prevented from opening any wider than obstacles in the door opening region permit. In particular, all of the moving objects in a specified region adjacent to the door can be detected with reference to their position, direction of motion and speed, so that the ACC system is capable of dealing with multiple targets.

The door opening arrangement according to the invention makes possible not only azimuthal triangulation of objects in a horizontal plane of constant height by the ACC system but, for monitoring traffic activity for example, also permits the height of objects that are located in the spatial region outside the door to be measured. The sensor system may be designed so that monitoring only takes place upon a demand for door opening.

The door opening arrangement according to the invention is usable for all kinds of doors, in particular for driver's, front-seat passenger's and back-seat-passengers' doors, as well as rear doors or tailgates, which may optionally also open upward.

In order to be able to fully monitor the region of swinging motion of the door in a specified region for potential obstacles, a phased-array antenna may be used, which in particular has a sensor beam displaceable over a large angular range, for example over 90 or 180°. The phased-array system may be a planar antenna system with an individual microwave radiator which is controllable with respect to amplitude and phase.

Preferably a plurality of antennas is provided, for example three to five antennas, each of which preferably has a broad directional characteristic. The position of an object can then be determined by a three-dimensional triangulation algorithm. The microwave radiator elements may be fastened to the vehicle at the same height or at different heights.

The microwave radiators preferably should be operated at approximately 77 GHz. The antennas preferably are planar regardless of the specific arrangement of the antenna components.

The antennas may in particular be mounted on trim, window frames, outside mirrors, blinkers, rear lights or front head-lights and/or wheel hubs or in the regions around those components. The antennas preferably are spaced over as great a length of the vehicle as possible in order to be able to monitor the door-opening region reliably. Antennas located in the door region may be mounted on the hinged edge of the door as well as on the free edge of the door. In particular, a plurality of associated antennas which cooperate for object detection may be located in the region between the axles of a vehicle or be located in front of the front axle or behind the rear axle of the vehicle.

The antennas may, with reference to a region defined by a 3-dB signal drop, have an apex angle of about 80 to 120° or beyond and, depending upon the directional characteristic of the antennas, detection may also take place outside this region.

A sensor arrangement for the door opening system may include a capacitive sensor, a video sensor, an infrared sensor and/or an ultrasound sensor. Radar sensors, in particular short-range radar sensors, which have an especially flat structural shape, are immune to fouling and permit monitoring over an angular range of 180° with reference to azimuth and elevation and over a radial range of two meters, are preferably used.

In addition, it is preferable for detection of distance from the object to be carried out continuously, i.e., dynamically. In other words, distance monitoring to a detected object is continued during motion of the vehicle or during motion of the door, in order to avoid reflection errors resulting from the relative motion. In addition, it is also possible to use sensors that perform scanning in the region of the door so that, if an object moves into the adjacent region or the door moves in the direction of the object, a kind of protective shield function is provided. This protective shield function may include emitting a warning signal tone, stopping the door opening function and automatic closing of the door so that an alighting passenger will not be injured.

It is also possible for the protective shield function to be designed so that the door is held as rigidly as possible in a fixed position. This is advantageous when a cyclist rides into the protective shield region so that the door does not close on the alighting user. In addition, in this situation, the cyclist can hold tightly to the rigidly arranged door and is not additionally endangered since he is not holding a movable object.

The antenna arrangement for object detection may be mono static and/or bistatic.

BRIEF DESCRIPTION OF THE DRAWINGS

Further objects and advantages of the invention will be apparent from a reading of the following descriptions in conjunction with the accompanying drawings, in which.

DESCRIPTION OF PREFERRED EMBODIMENTS

Figure 1:
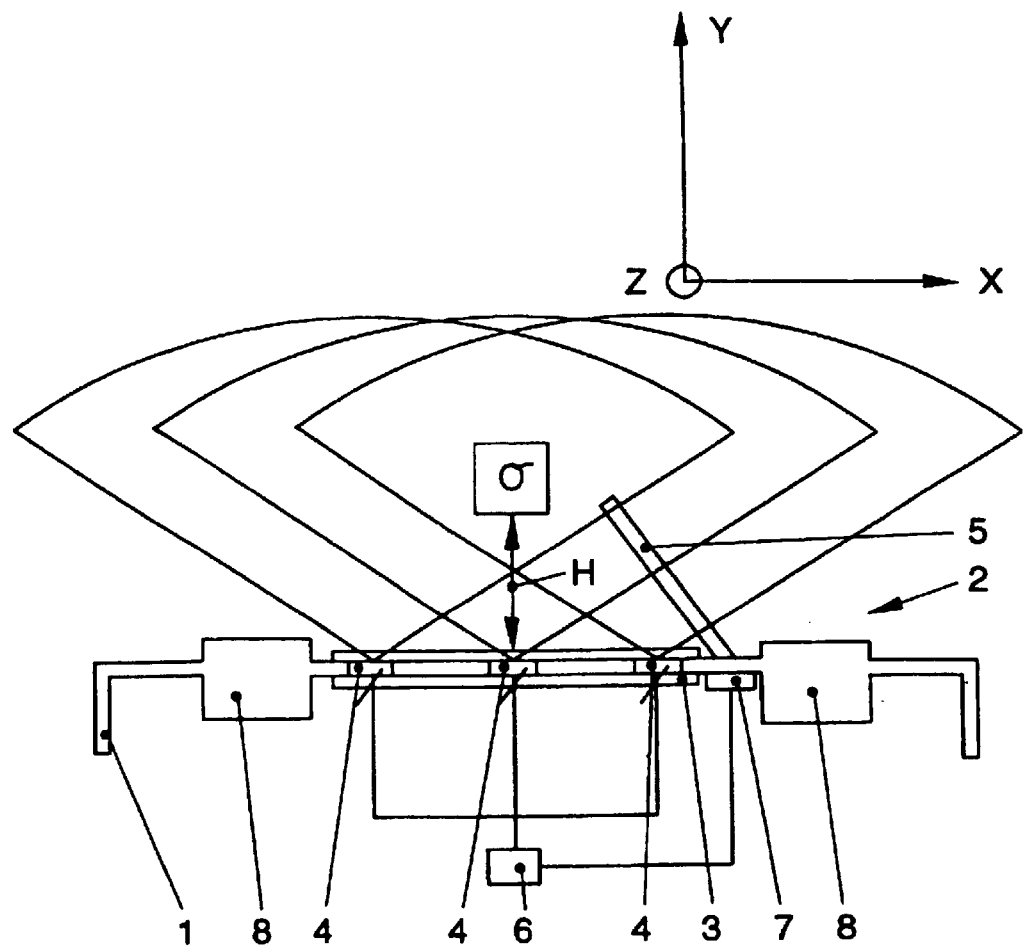
FIG. 1 is a schematic top view of a vehicle showing a representative embodiment of a door opening arrangement having three antennas located between the axles of the vehicle and illustrates the horizontal distribution of the antennas including their azimuthal directional diagrams.

In the typical embodiment of the invention shown in FIG. 1, a motor vehicle 1 includes a door opening arrangement 2, with a sensor system 3 having three antennas 4 for determining the position of an object O in a specified volumetric region outside the door 5. In this embodiment the antennas 4 are radar antennas and form a complete triangulation system for determining the position of the object O with respect to its distance from a specific reference point of the vehicle, as well as the height H of the object above the ground.

The directional characteristic of the detection region of the antennas 4 is defined by the envelope designating a 3 dB drop in the detected signal.

Each of the antennas 4 is located at a different height on the vehicle and is driven at a frequency of about 77 GHz.

The antennas 4 are connected to a computing unit 6 which, can determine the location of an object O in the protected region by a three-dimensional triangulation algorithm.

The computing unit 6 is coupled with the door-limiting device 7, which either blocks the door from opening or permits manual opening of the door as a function of the detected location of an object O. The sensor system and the door opening device 7 are designed so that the door can be opened until it is at a specified distance from an object located in the door opening region. In addition, the door opening device 7 causes the door opening resistance, which must be overcome when opening the door, to increase continuously with decreasing distance from the detected object.

In the example shown in the drawings, the antennas 4 are located between the front and rear axles 8 of the vehicle.

Figure 2:
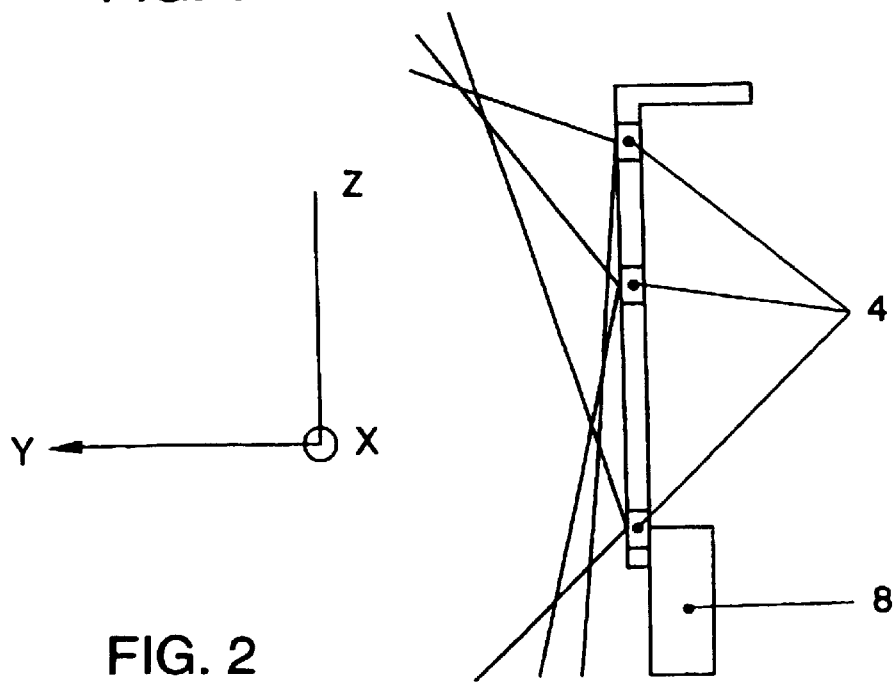
FIG. 2 is a schematic rear view of the vehicle similar to that drawing in FIG. 1 with a door opening system having three antennas which are arranged in an end region of the vehicle and illustrates the vertical distribution of the antennas including their directional diagrams with reference to elevation.

FIG. 2 shows a door opening arrangement of the same type shown on FIG. 1 as viewed from the rear of the vehicle.

In this case, however, the antennas 4 are illustrated with reference not to their horizontal distribution but to their vertical distribution.

Figure 3:
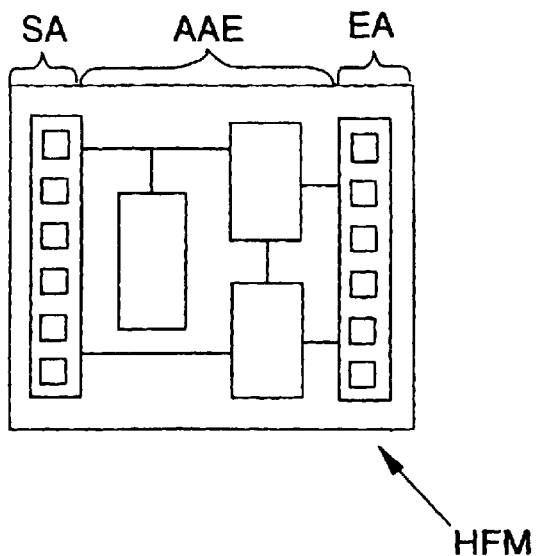
FIG. 3 is a schematic view illustrating a representative radar module for use in the sensor system.

FIG. 3 shows a representative radar module. A control and analysis electronics unit AAE is located between a transmitting antenna SA and a receiving antenna EA. A high-frequency signal generating module HFM is located on the back of the module. With this radar module, distance measurement is performed in the GHz frequency range with an accuracy of ±4 cm. This radar module is independent of its surroundings and has a high integration potential. A radar module of this type with a detection range of up to 20 meters is possible.

If desired, however, the range may be correspondingly reduced for detection in the near region.

Figure 4:
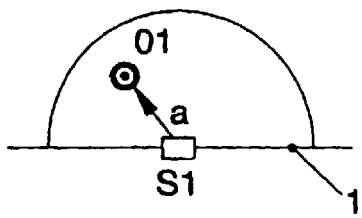
FIGS. 4–7 are schematic diagrams illustrating detection of objects with various antenna arrangements.

FIGS. 4–7 show various object detection arrangements. FIG. 4 shows detection of object distance with a single sensor S1 for an object O1 which has a small reflection center. The object distance can only be detected from the sensor S1 to the reflection center of the object O1, and accurate determination of the distance of the object O1 from the motor vehicle 1 together with the location of the object is not really possible with this antenna system. If, on the contrary, a picture of the object O1 could be made, determination of the object position would be possible by using the measured values.

Figure 5:
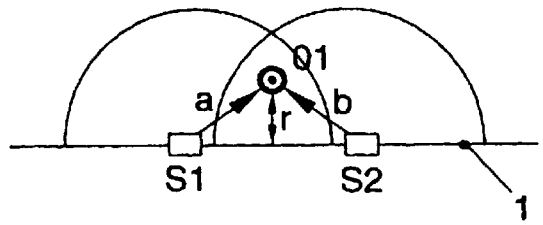
Figure 6:
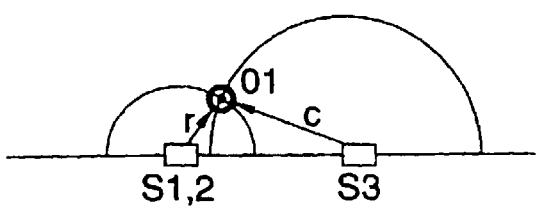

FIG. 5 shows two sensors S1 and S2 by which the object distances a and b are determined. The distance R from the vehicle 1 is then calculated by triangulation. An arrangement having three sensors S1–S3 is illustrated in FIG. 6, which permits a height determination to be made in addition to distance and location in a horizontal plane.

Figure 7:
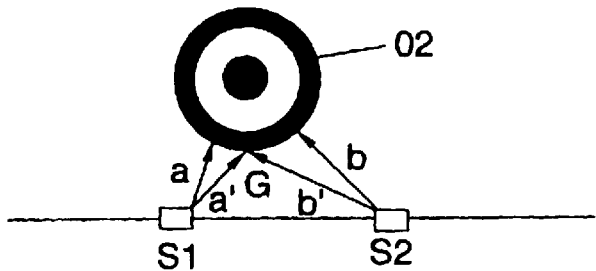

FIG. 7 shows an object O2 which does not have an identifiable reflection center. This may happen when the object is shaped so that the distances a and b detected by two sensors S1 and S2 do not derive from a single reflection center but from separate reflection points. With this arrangement, a measurement carried out at various points of time and, for example, with a moving object or with moving sensors, which may be located for example on the door, makes it possible to detect the boundary regions G of the object O2.

Although the invention has been described herein with reference to specific embodiments, many modifications and variations therein will readily occur to those skilled in the art. Accordingly, all such variations and modifications are included within the intended scope of the invention.

What is claimed is:

1. An automatic door opening arrangement for motor vehicles comprising a sensor system for detection of objects in a selected region adjacent to a vehicle, at least one vehicle door, and a computing unit for determining entry of an object into the selected region, wherein the sensor system is arranged to permit detection of the height of an object located in the selected region with respect to the height of the bottom of the vehicle door to determine whether the vehicle door can be opened.

2. An automatic door opening arrangement according to claim 1 wherein the sensor system permits the height of an object located in the selected region to be determined as an absolute height.

3. An automatic door opening arrangement according to claim 1 wherein the sensor system permits the height of an object located in the selected region to be determined with reference to a selected threshold height value or height region.

4. An automatic door opening arrangement according to claim 1 wherein the sensor system includes an adaptive or automatic cruise control system.

5. An automatic door opening arrangement according to claim 1 wherein the sensor system includes a plurality of cooperating antennas with broad directional characteristic for object location determination.

6. An automatic door opening arrangement according to claim 1 wherein the computing unit utilizes a three-dimensional triangulation algorithm for determination of object location.

7. An automatic door opening arrangement according to claim 1 wherein the sensor system operates at a frequency of about 77 GHz.

8. An automatic door opening arrangement according to claim 1 wherein the sensor system is capable of detecting multiple targets.

9. An automatic door opening arrangement according to claim 1 wherein the sensor system includes planar sensing elements for mounting on the surface of the vehicle.

10. An automatic door opening arrangement according to claim 1 wherein the sensor system comprises a radar device.

* * * * *